June 15, 1926.
VAN BUREN SHARPE ET AL
1,589,249
COTTON CHOPPER
Filed Oct. 17, 1922
3 Sheets-Sheet 3
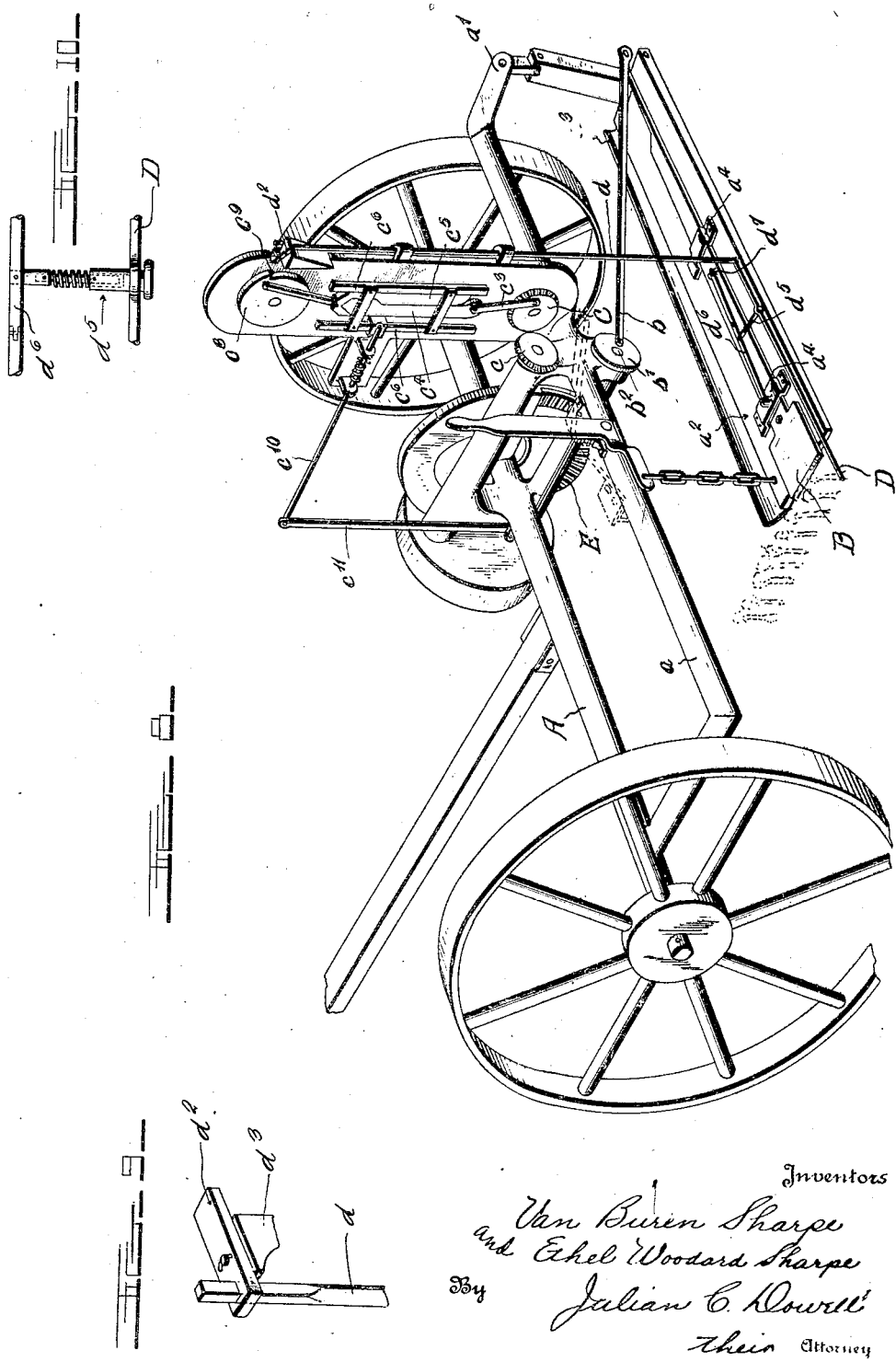
Inventors
Van Buren Sharpe
and Ethel Woodard Sharpe
By Julian C. Dowell
Their Attorney Patented June 15, 1926.

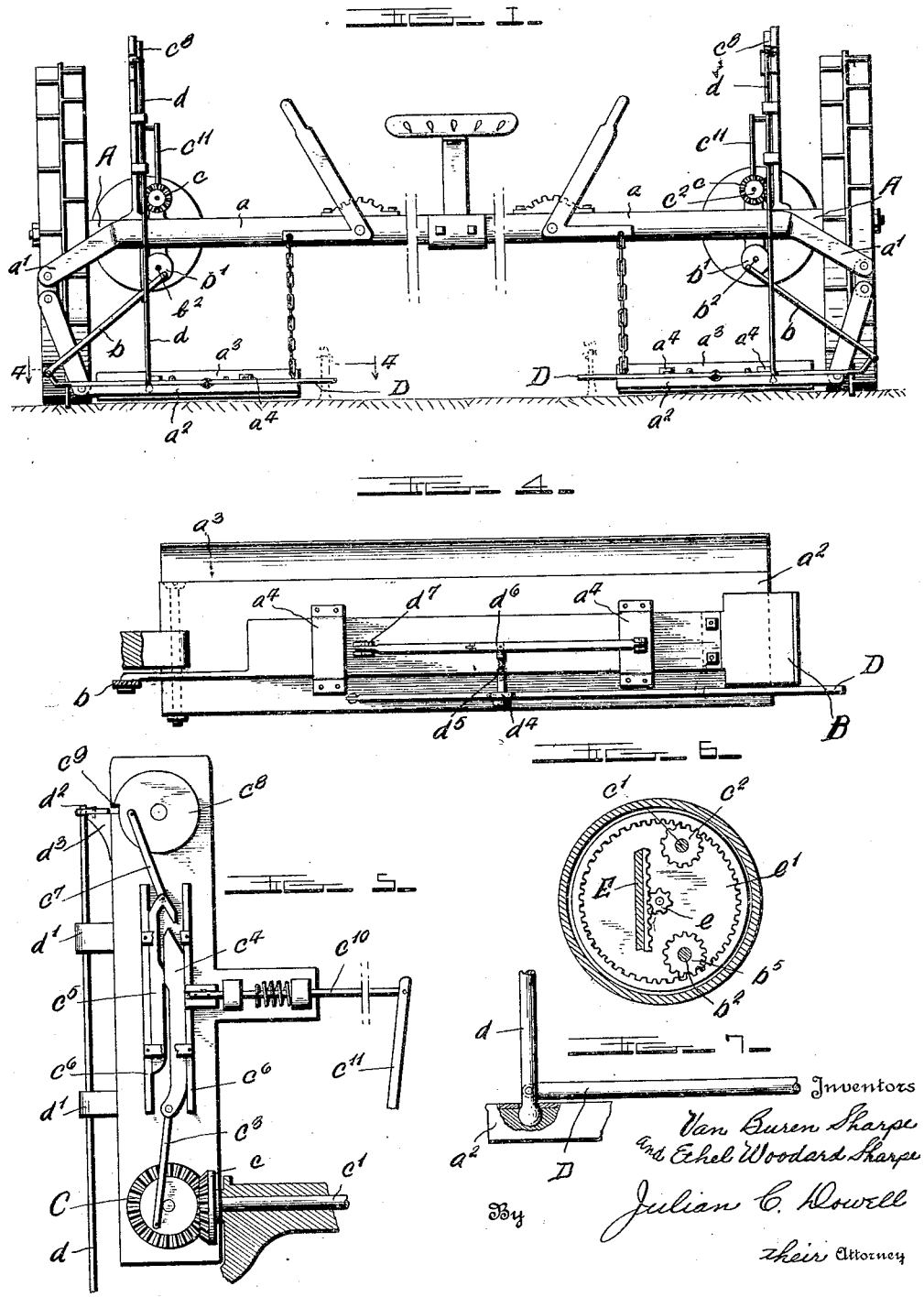

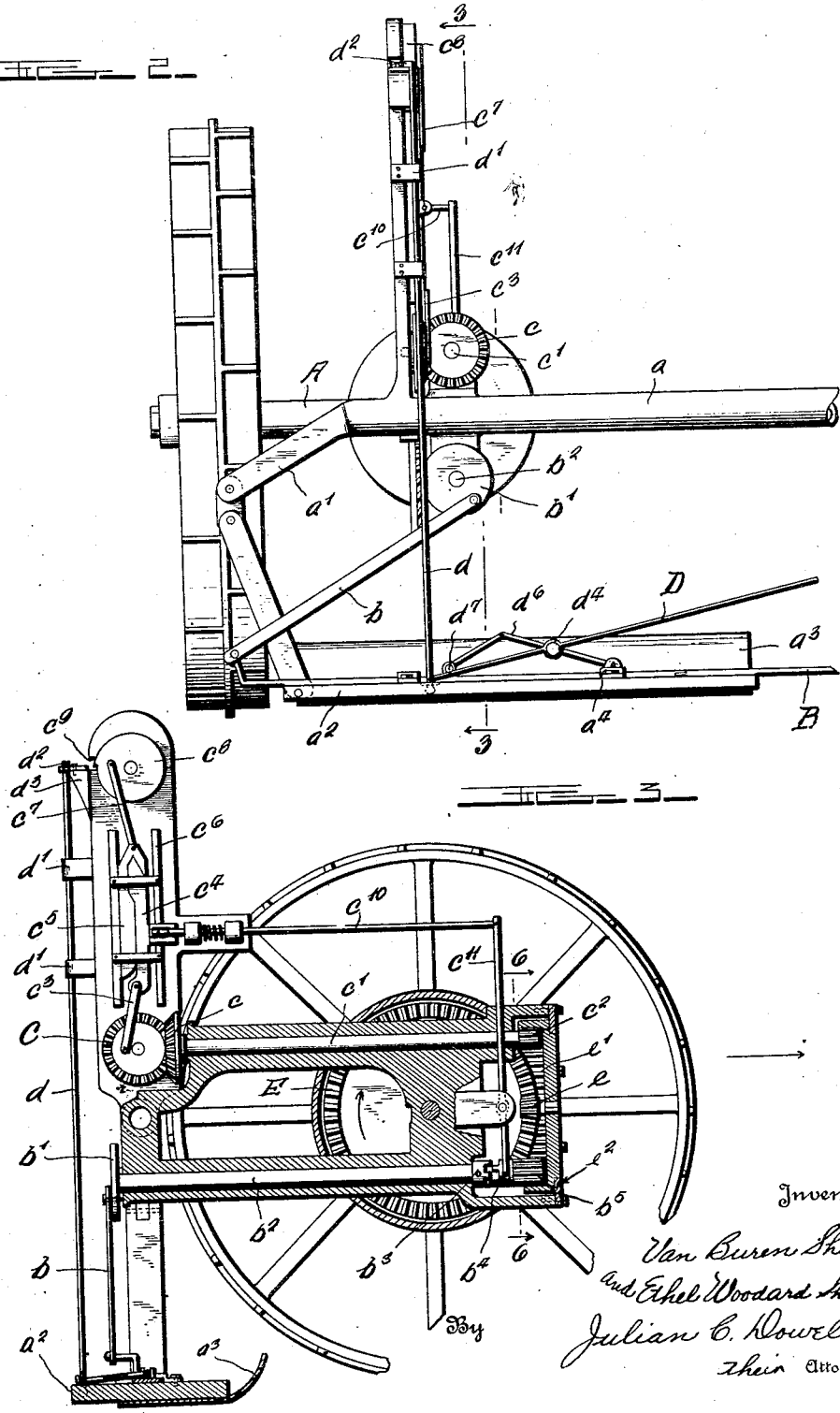

1,589,249

UNITED STATES PATENT OFFICE.

VAN BUREN SHARPE AND ETHEL WOODARD SHARPE, OF WILSON, NORTH CAROLINA.

COTTON CHOPPER.

Application filed October 17, 1922. Serial No. 595,069.

This invention relates to mowers and more particularly to intermittently operated corn, beet-stalk and cotton chopping machines for chopping and thinning out the rows of standing plants so as to leave the plants in bunches or hills.

The object of our invention is to provide a machine of the character referred to, which through an automatically tripped, cam actuating mechanism, causes a reciprocating chopper blade to function intermittently at intervals dependent upon the measured space between growing stalks or plants in a row.

A further object of our invention is to provide a machine of the character referred to which will effectually chop stalks or plants of corn, beets, or cotton, at spaced intervals along a growing or standing row, without injuring such plants as may be left uncut.

Our invention will first be hereinafter more particularly described, with reference to the accompanying drawings, which are to be taken as a part of this specification, and then pointed out in the claims at the end of the description.

In said drawings, Fig. 1 is a rear elevational view of my improved cotton chopping machine, illustrating its assembly and the manner in which the vehicle straddles rows of corn, beet-stalks or cotton plants, the chopping blade being in normal position;

Fig. 2 is an enlarged partial view also in elevation of the rear of the machine, the trigger rod being shown in partially raised position and the chopping blade moved slightly forward at the beginning of its chopping stroke;

Fig. 3 is a detailed view in elevation and partly in section, taken transversely of the vehicle on the line 3—3 of Fig. 2;

Fig. 4 is a detailed enlarged plan view of the blade carrying platform, taken on the line 4—4 of Fig. 1;

Fig. 5 is a partial enlarged detailed view in elevation and partly in section of the cam actuating mechanism in "tripped" position;

Fig. 6 is detailed sectional view of the actuating gear arrangement taken on the line 6—6 of Fig. 3.

Fig. 7 is an enlarged detail view showing in section the ball and socket attachment of the "tripping" rod to the chopping blade platform, and the pivotal attachment of the trigger rod thereto;

Fig. 8 is a perspective view of a modification of my improved chopping machine adapted to chop a single row of corn, beet-stalk or cotton plants, in which a unitary assembly of the cam actuating mechanism and chopper blade with associated elements is used;

Fig. 9 is a perspective detail view of the trigger operated rod illustrating its operative connection with an oscillated cam tripping element, the former being fragmentarily shown; and Fig. 10 is a fragmentary plan view of the trigger rod illustrating its yielding connection with a blade operated link member by which it is periodically elevated from operative position.

Referring to the drawings, in which like reference characters are used to denote corresponding parts throughout the several views, A represents a chassis or vehicle of the mower type having the usual traction wheels and driver's seat.

Spaced longitudinally of the axle and rearwardly extended therefrom by means of suitable transverse supporting members forming a part of the vehicle framework, is a rack member or work element support bar $a$ provided at either end with laterally extended arms $a^1$ to which suitable link members are pivotally secured to provide a flexible suspension for one end of the chopper blade platform $a^2$. The other end of this platform may be supported by a linked chain, the latter being secured to an ordinary bell crank lever as illustrated, the manipulation of which in a well known manner will permit the blade carrying platform to be raised from operative position above the ground. To the underside of the blade-carrying platform $a^2$ a shoe plate $a^3$ is preferably attached, said plate extending forwardly and upwardly in a partial curve, providing a guard for the platform which will accommodate it to the undulations of the ground and likewise protect the associated elements carried thereby from rocks, stumps, or other impediments imbedded in the soil over which the vehicle may be driven.

Reciprocably movable between common guides $a^4$ on the platform $a^2$ is a chopper blade B, said chopper comprising a sharpened head secured at the free end of an extended shank member, the other end of which is tapered and conveniently bent so as to establish pivotal connection with one end of a pitman $b$, the other end of which is eccentrically connected to a crank element $b^1$, said crank being keyed to one end of a driven shaft $b^2$, the latter being preferably journaled in one of the transverse supporting members of the vehicle framework. Intermediate its other end and within a suitable space or housing provided therefor the shaft $b^2$ carries a recessed or notched metallic collar $b^3$ keyed thereto and rotatable therewith, said collar being adapted to intermittent engagement with protruding teeth or dogs provided on an opposing idling collar $b^4$, loosely rotatable over the same shaft, the two collar members being normally out of engagement. The collar $b^4$ may be either integral with or keyed to an ordinary pinion $b^5$, the latter being also idly rotatable on the shaft $b^2$, in mesh with and continuously driven by a suitable gear to be hereinafter specifically referred to and described, to which rotation is imparted indirectly through a convenient gear arrangement, the driving power being preferably taken from the traction wheels of the vehicle when in motion. It will thus be seen that an ordinary dog clutch is provided, by which rotation will be transmitted to the shaft $b^2$ when the collar elements $b^3$ and $b^4$ are caused to engage with one another.

Intermittent reciprocation of the chopper blade B through the elements above described is caused by a novel tripped cam actuating mechanism which is conveniently carried by a flat upright section mounted on the chassis or vehicle, said mechanism comprising an ordinary beveled gear C constantly engaged with and driven by a similarly beveled gear $c$, the latter being keyed to one end of a driven shaft $c^1$, corresponding essentially to the shaft $b^2$. A pinion $c^2$, oppositely disposed from the pinion $b^5$ within the same housing and continuously driven by the same gear, is permanently keyed to the opposite end of the shaft $c^1$. One end of a pitman $c^3$ is eccentrically connected to the beveled gear C, its other end being pivotally secured to the lower extremity of an element $c^4$ which forms one of a pair of co-operable and complementary cam faced slide elements designated $c^4$ and $c^5$, respectively, as clearly shown in Figs. 3 and 5, which latter are adapted to be normally reciprocably movable in unison between spaced guides $c^6$ provided for such purpose on the upright supporting section. To the upper extremity of the cam faced element $c^5$, one end of a pitman $c^7$ is pivotally connected, the opposite end being eccentrically connected to an element $c^8$, the latter normally having an oscillatory or rocking motion imparted thereto through the elements just described and being provided with a detent or notch as indicated at $c^9$ for a purpose to be hereinafter explained. A thrust rod $c^{10}$ provided with a friction head or block is mounted at right angles to the edge of the cam faced slide elements $c^4$ and $c^5$ within suitable journal members provided for such purpose on a laterally extended section of the upright support, and is preferably placed under the tension of a small spring therebetween, so that normally the friction head or block will be held against the edge of the cam faced slide $c^4$. The opposite or forward end of the thrust rod is connected to an intermediately fulcrumed lever $c^{11}$, the latter being preferably bifurcated or forked at its free end adapting it to fit over the clutch collar $b^4$, said bifurcated or forked ends being lodged within a peripheral groove milled or cut in said clutch collar. It will be readily understood that when the oscillating member $c^8$ is suddenly interrupted in its normal oscillatory or rocking movement imparted thereto from the shaft $c^1$ by the above described co-operable elements, the respective cam faced elements $c^4$ and $c^5$, (as shown in Fig. 5), will be drawn apart, causing the cam element $c^4$ to forcibly press against the adjacent end of the thrust rod $c^{10}$ and thrust it forwardly against the tension of its opposing spring, thus actuating the fulcrumed rod $c^{11}$ causing it to slide the collar $b^4$ rearwardly into engagement with the notched collar element $b^3$ on the shaft $b^2$, thereby imparting rotation to the latter.

One end of a trigger rod D is pivotally connected to the base portion of a trip rod $d$, the latter being rotatively secured at one end to the base of the chopper blade platform $a^2$ by a suitable ball and socket arrangement such as illustrated in detail in Fig. 7. The trip rod $d$ is longitudinally rotatable between spaced journals or guides $d^1$, which are provided to hold said rod in alignment with the cam actuating mechanism hereinbefore described, said trip rod being "squared" at its free end and projected through a square hole formed in one end of a trip or catch finger $d^2$, the latter being transversely movable in an arc across a small shoulder member or supporting bracket $d^3$ by means of a slot and pin connection therewith as clearly illustrated in Fig. 9. The catch finger portion $d^2$ on the trip rod $d$ is normally held clear of the oscillating member $c^8$ aided by a small tension spring interposed between the catch finger and a small stud (not designated) on the bracket $d^3$, but when the rod $d$ is slightly rotated within its journals $d^1$ the catch finger or projecting portion $d^2$ will be brought into opposition against the detented or notched element $c^8$ so that it will catch or engage the notched portion $c^9$ thereon, consequently interrupting the normal oscillatory movement of the same. It will be understood that the rod $d$ is free to move up or down within the square hole in the catch finger $d^2$ as the vehicle is driven over uneven ground.

Intermediate its ends the trigger rod D is suitably formed with an "eye" as indicated at $d^4$, clearly illustrated in Fig. 2, thereby adapting it to a fulcrum connection with a projected two-part or telescopical arm $d^5$ secured at one end to a lazy-tong link member $d^6$, one end of which is pivotally secured to one of the stationary guides $a^4$ on the chopper blade platform, the other end being likewise pivotally connected between the sections of a suitable bifurcated stud bracket $d^7$ provided therefor on the shank portion of the chopper blade B. The projecting telescopic arm $d^5$ is preferably formed in two parts as illustrated in Fig. 10, one of which parts is projected through the "eye" formed in the trigger rod D and provided with a head to prevent disconnection of the trigger rod therefrom. A tension spring is also provided between the telescoping parts tending normally to hold the parts together and hold the rod D substantially parallel with the blade B, said spring also being adapted to draw the rod D to normal position. When the free end of the trigger rod D comes into contact against the opposing base of a corn, beet-stalk or cotton plant as the vehicle is driven forward, the end of the rod will be caught and held from further progress over the ground with relation to the vehicle, thus causing it to give or spring backward forcing the trip rod $d$, to which as hereinbefore stated it is pivotally secured and adapted to impart slight rotation within the journals $d^1$, swinging the associated catch finger or projecting portion $d^2$ into position where the notch $c^9$ in the rocking member $c^8$, will trip thereagainst, thus interrupting the normal oscillatory or rocking motion of said member, and causing the cam faced slides $c^4$ and $c^5$ to disengage and spread apart to actuate the thrust lever $c^{10}$ as before described.

Within a suitable dust proof housing provided therefor in the chassis or vehicle framework a large plate beveled gear E rotatable with the axle of the chassis or vehicle is provided. Continuously in mesh with the gear E a pinion $e$ is provided, the latter being keyed upon a stub shaft which projects at right angles from the center of a flanged plate gear $e^1$ to which it may be riveted or otherwise non-rotatably secured. The back face of the gear $e^1$ as illustrated in Fig. 3, may also serve as a cover plate for the gear housing permitting ready access to the gear chamber, in which case an annular metallic ring $e^2$ bolted to the open peripheral edge of the housing casing may be utilized to provide a bearing support for the gear $e^1$ and secure the former in place. Pinions $c^2$ and $b^5$ are permanently meshed with the gear $e^1$. From the foregoing it will be understood that as the vehicle is driven forward the axle will impart rotary movement to the gear E, such motion being transmitted through the pinion $e$ to the flanged plate gear $e^1$ and subsequently to the pinions $c^2$ and $b^5$, respectively.

The operation of our improved cotton chopping machine is as follows:

The vehicle A may be drawn by horses or other means along a row of corn, beet-stalk or cotton plants. The free end of the trigger rod D will be interrupted in its progress with relation to the vehicle and drawn backward upon coming in contact with a plant and will accordingly effect the partial rotation of the trip rod $d$ within its journals $d^1$, swinging the catch finger or projecting portion $d^2$ into contact against the notch or detent in the rocking member $c^8$, tripping the latter and suddenly stopping its normal oscillatory or rocking movement, consequently holding the cam faced element $c^5$ stationary and permitting its co-operable and complementary element $c^4$ to disengage and separate therefrom as the latter continues to reciprocate between the guides $c^6$, actuated by the associated pitman and gear arrangement hereinbefore described in connection with the shaft $c^1$, the latter being continuously rotated by the pinion $c^2$. So long as the oscillatory or rocking motion of the element $c^8$ is thus interrupted, the co-operable and complementary cam faced slides $c^4$ and $c^5$ will be held apart as illustrated in Fig. 5, and the thrust rod $c^{10}$ will be held forward, causing the fulcrumed lever $c^{11}$ to slide and hold the clutch collar $b^4$ into engagement with its associated member $b^3$. Rotation to the shaft $b^2$ and likewise to the crank $b^1$ is thus imparted as the vehicle progresses and the pitman $b$ impelled by the crank $b^1$ will actuate the reciprocable chopper blade B in a series of chopping strokes. As the blade B moves forward the lazy tong link $d^6$, carrying the projecting telescopic arm $d^5$, over which the trigger rod D is fulcrumed, will tend to fold together, consequently lifting or raising the rod D as indicated in Fig. 2, sufficiently high to pass over the tops of other plants in the row, preventing injury thereto until the chopper blade has completed several strokes, whereupon the rod will again descend to normal position by virtue of its own weight.

It will be understood that the blade B may be reciprocated through a series of chopping strokes so long as the catch finger $d^2$ on the trip rod $d$ is held in engagement with the rocking element $c^8$, but when the trigger rod D returns to normal position parallel with and resting upon the chopper blade platform, the trip rod $d$ will be reversely rotated, thus swinging the catch finger $d^2$ out of engagement with the rocking element $c^8$, whereupon all parts will again assume normal position and operation. The complete cycle of operation above described in actual use and practice is exceedingly rapid, consecutive and continuous, complete cycles of operation being desired and accomplished with my improved cotton chopper, the rapidity of operation depending of course upon the ratio established between the several gears. From the foregoing it will be clearly understood that intermittent reciprocal motion is imparted to the blade B at periods depending upon the measured distance between growing plants of corn, beet-stalk, or cotton and that my improved cotton chopping machine will intermittently cut such plants at spaced intervals along the length of the growing plants to thin them out.

In the illustrated embodiment of the invention, as shown in Fig. 1 of the drawings, the wheeled frame straddles two rows of cotton, each cutter being adapted to operate on one row from the outer side thereof, the two rows being arranged between the two cutters; but it may be desirable to arrange both cutters between two rows of cotton, in which case one cutter will be arranged slightly in advance of the other, and instead of a cutter operating on the outer side of each row, each cutter will operate on the inner side of a row, or the side thereof which faces the adjoining row, the wheels of the vehicle however traveling upon the outer sides of the two rows as described but being arranged closer together than in the arrangement shown in Fig. 1. Such re-arrangement or modification will embody in its construction substantially the same combination of elements as that shown in Fig. 1, operating in the same manner, to produce the same result, involving merely a re-arrangement and adaptation of the cutters to operate between two rows instead of on the outer sides of two rows.

Since various changes in detail and arrangement of parts may be made without departing from the spirit and scope of our invention, we do not desire to be limited by the appended claims to the specific structure illustrated and described.

Having thus described our invention, what we claim as new and desire to secure by Letters Patent of the United States is:—

1. In a cotton chopper, the combination of a wheeled vehicle having a cutter carried thereby, a cutter controlling device comprising a support; guides carried by said support; a pair of co-operable cam elements movable between said guides; means for continuously reciprocating one of said cam elements and thereby causing the other of said elements normally to reciprocate in unison therewith; means for periodically interrupting the movement of the second mentioned of said elements independently of the first; driving means for effecting the operation of the cutter when movement of said second mentioned element is interrupted; and means operated by said first mentioned element for throwing said driving means into blade operating position upon interrupted movement of said second mentioned element.

2. In a cotton chopper, the combination with a vehicle carrying a stalk cutter; of a cutter controlling means comprising a support; guides mounted on said support; a pair of co-operable and complementary cam elements movable between said guides; means for continuously actuating one of said elements and thereby causing both elements normally to move in unison; means for interrupting the movement of one of said elements without interrupting movement of the other; together with axle driven means for effecting the operation of the cutter controllable through the relative movement of said cam elements.

3. In a cotton chopper, a cutter controlling device comprising in combination with a cutter and normally disengaged actuating mechanism therefor; a support; guides mounted on said support; a pair of co-operable and complementary cam elements movable between said guides; means for continuously actuating one of said cam elements thereby causing both of said elements normally to move in unison; an oscillating member normally actuated by the other of said cam elements; means for intermittently tripping said oscillatory member whereby said cam elements are temporarily disengaged and spread apart; and means operated by one of said cam elements for throwing said mechanism into cutter actuating engagement when said cam elements are drawn apart.

4. A cotton chopper comprising in combination, a wheeled vehicle; a stalk cutting blade carried by said vehicle; axle-driven mechanism adapted to movement in position for actuating the cutting blade; and automatically controlled means for periodically effecting the operation of the blade therethrough, said means including co-operable and complementary cam-faced elements, a rocking member; means connected with one of said elements whereby it is given a reciprocatory movement, and means connected with the other of said elements whereby motion is imparted to said rocking member, means for tripping said rocking member and thereby causing said cam elements to disengage and spread apart; together with means actuated by one of said cam elements when disengaged from the other for throwing said mechanism into blade operating position.

5. In a cotton chopper, the combination of a wheeled vehicle; a stalk cutting blade carried by said vehicle; normally idling mechanism driven by the axle of said vehicle for intermittently actuating the cutting blade; and means causing said mechanism to effect intermittent operation of the blade, said means comprising a pair of co-operable and complementary cam-faced slide elements and means for reciprocating one of said elements thereby causing both elements normally to move in unison between spaced guides, the latter means comprising a rotating gear, a pitman having one end eccentrically connected to said gear with its other end connected to the first mentioned cam element, a driving gear in mesh with said first named gear and adapted to rotate the latter, and a continuously rotating shaft to which said last mentioned gear is keyed, together with stalk and gravity actuated means for alternately interrupting and permitting the cooperative movement of said slide elements for periodically throwing the parts of said mechanism into and out of position for operating the cutter.

6. A cotton chopper comprising in combination, a wheeled vehicle; a support suspended on the vehicle; a reciprocating stalk cutting blade carried by said suspended support; normally idling and disengaged mechanism driven by the axle of the vehicle for actuating the cutter blade when thrown into operative relation thereto and automatically retractable stalk actuated means for throwing said mechanism alternately into and out of engagement and operative relation to the blade and intermittently effecting a reciprocatory movement of the latter.

7. A cotton chopper comprising in combination, a wheeled vehicle; a stalk cutting blade carried by said vehicle; and mechanism driven by the axle of the vehicle for periodically actuating the cutting blade; said means including a rotatable shaft; a crank on one end of said shaft; a pitman connecting said crank and blade; and engageable gear driven clutch carried by said shaft whereby rotation is intermittently imparted thereto; and means for effecting the engagement of said clutch comprising a fulcrumed lever having one end operatively connected with said clutch element and a thrust-rod connected to the opposite end of said lever; means for intermittently causing said rod to rock said lever, comprising cooperable and complementary cam faced slide elements normally reciprocating in unison between spaced guides; an oscillating element actuated by one of said cam elements; and stalk actuated means for intermittently tripping said oscillating element whereby said cam elements are caused to disengage and spread apart, thereby causing one of said cam elements to impinge against said rod and move the latter to rock said lever to clutch engaging position.

8. A cotton chopper comprising in combination, a wheeled vehicle; a reciprocating stalk cutting blade; normally idling mechanism driven by the axle of said vehicle for actuating said blade; and means for periodically throwing said mechanism into operable relation to said blade; said means comprising co-operable and complementary cam-faced slide elements movable between spaced guides; a driven shaft; connecting means between said shaft and said cam-faced elements for normally reciprocating the latter in unison; a detented oscillating member rocked by one of said movable cam elements; and means for periodically tripping said oscillating member, causing said cam-faced elements to disengage and spread apart the latter means comprising a trigger-rod carried by said vehicle adapted to contact with cotton stalks when the vehicle is driven along a standing row; a bearinged trip-rod pivotally connected with said trigger-rod; said trip-rod being provided with a catch finger for engaging the detented oscillating member and slightly rotatable in its bearings when said trigger-rod contacts with a cotton plant, thereby swinging the catch finger of said rod into position against said oscillating member to trip the same, thereby throwing said mechanism into operative relation to the blade.

9. The combination, in a cotton chopper of a wheeled vehicle; a cutter support suspended from said vehicle; a reciprocating cutter blade mounted on said support; clutch-controlled means driven by the axle of the vehicle for reciprocating said blade; and means for intermittently throwing the clutch into blade operating position; said means comprising slidably mounted cam-faced elements having inter-engaging cam surfaces constructed so that said elements are caused to normally move in unison without moving the cutter blade clutch while permitting one of said elements to disengage and move independently of the other, a shaft adapted to be continuously driven by the axle of the vehicle when in motion; connecting means between said shaft and the first mentioned cam element for imparting continuous reciprocatory movement thereto in unison with or independently of the second mentioned cam element; means actuated by contact with cotton stalks for intermittently arresting the movement of said second mentioned cam element and causing the two elements to disengage and spread apart;

and means actuated by said first mentioned cam element when disengaged from the other, for moving said clutch into blade operating engagement.

10. In a cotton chopper, a reciprocating cutter blade and normally disengaged actuating mechanism therefor, means for intermittently imparting reciprocatory movement to said blade through said mechanism, said means comprising cam-faced elements slidably mounted on the machine frame with the cam surfaces thereof facing each other constructed so that the two elements are caused to move normally in unison but to separate upon interrupted movement of one of them, means for continuously moving the other element; automatically retractable means actuated by the continuously movable element for throwing said mechanism into position for operating the cutter when said elements are separated, together with stalk and gravity actuated means for alternately interrupting and permitting the cooperative movement of said cam elements and intermittently cause said mechanism to be thrown into and out of position for operating the cutter.

In testimony whereof we affix our signatures.

VAN BUREN SHARPE.
ETHEL WOODARD SHARPE.